United States Patent
Jiang

(10) Patent No.: US 11,337,254 B2
(45) Date of Patent: May 17, 2022

(54) RANDOM ACCESS METHOD AND DEVICE, USER EQUIPMENT AND BASE STATION

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 149 days.

(21) Appl. No.: 16/781,425

(22) Filed: Feb. 4, 2020

(65) Prior Publication Data
US 2020/0178310 A1   Jun. 4, 2020

Related U.S. Application Data

(63) Continuation of application No. PCT/CN2017/096909, filed on Aug. 10, 2017.

(51) Int. Cl.
H04W 74/08 (2009.01)
H04B 7/0413 (2017.01)

(52) U.S. Cl.
CPC ...... H04W 74/0833 (2013.01); H04B 7/0413 (2013.01)

(58) Field of Classification Search
None
See application file for complete search history.

(56) References Cited

U.S. PATENT DOCUMENTS

| | | | | |
|---|---|---|---|---|
| 2016/0270121 | A1* | 9/2016 | Bergstrom | H04W 74/0833 |
| 2019/0223157 | A1* | 7/2019 | Hwang | H04W 74/0833 |
| 2019/0320467 | A1* | 10/2019 | Freda | H04L 5/0055 |
| 2019/0350001 | A1* | 11/2019 | Takeda | H04B 7/088 |

FOREIGN PATENT DOCUMENTS

| | | |
|---|---|---|
| CN | 106922033 A | 7/2017 |
| CN | 107006037 A | 8/2017 |
| EP | 3 048 851 A1 | 7/2016 |
| WO | WO 2015/020869 A1 | 2/2015 |
| WO | WO 2016/086982 A1 | 6/2016 |
| WO | WO 2017/055302 A1 | 4/2017 |

OTHER PUBLICATIONS

R1-1710035 "Further details on NR 4-step RA Procedure" CATT 3GPP TSG RAN WG1 NR ad-Hoc#2 Jun. 27-30, 2017 (Year: 2017).*
European Search Report in European Application No. 17921092.7, dated Feb. 4, 2021.
Fujitsu, Discussion on 4-step RA procedure, 3GPP TSG RAN WG1 NR Ad-hoc#2, R1-1710234, Qingdao, P.R. China, Jun. 27-30, 2017, 7 pages.

(Continued)

Primary Examiner — Jeffrey M Rutkowski
Assistant Examiner — Basil Ma
(74) Attorney, Agent, or Firm — Finnegan, Henderson, Farabow, Garrett & Dunner, L.L.P.

(57) ABSTRACT

A random access method includes: determining to initiate a random access; judging whether to use multi-preamble transmission; and when determining to use multi-preamble transmission, transmitting a preamble through an acquired multi-preamble transmission opportunity, to perform random access.

17 Claims, 14 Drawing Sheets

(56) References Cited

OTHER PUBLICATIONS

CATT, Further details on NR 4-step RA Procedure, 3GPP TSG RAN WG1 Meeting #89, R1-1707464, Hangzhou, P.R. China, May 15-19, 2017, 7 pages.
Ericsson, Random Access in NR, 3GPP TSG-RAN WG2#98-AH, Tdoc R2-1707126, Qingdao, P.R. of China, Jun. 27-29, 2017, 5 pages.
Samsung, Random Access Procedure—Access Delay Minimisation, 3GPP TSG-RAN WG2 Meeting #98, R1-1704158, Hangzhou, China, May 15-19, 2017, 3 pages.
Further details on NR 4-step RA Procedure, CATT, 3GPP TSG RAN WG1 Meeting #88, Athens, Greece, Feb. 13-17, 2017, 6 pgs.
Further details on NR 4-step RA Procedure, CATT, 3GPP TSG RAN WG1 Meeting #88bis, Spokane, USA, Apr. 3-7, 2017, 6 pgs.
Further details on NR 4-step RA Procedure, CATT, 3GPP TSG RAN WG1 Meeting #89, Hangzhou, P.R. China, May 15-19, 2017, 7 pgs.
Further details on NR 4-step RA Procedure, CATT, 3GPP TSG RAN WG1 NR Ad-Hoc#2, Qingdao, P.R. China, Jun. 27-30, 2017, 7 pgs.

\* cited by examiner

RANDOM ACCESS METHOD AND DEVICE, USER EQUIPMENT AND BASE STATION

CROSS-REFERENCE TO RELATED APPLICATIONS

The present application is a continuation of International Application No. PCT/CN2017/096909, filed on Aug. 10, 2017, the entire contents of which are hereby incorporated by reference.

TECHNICAL FIELD

The present disclosure relates to the field of communication technology, and in particular, to a random access method and a random access device, user equipment and a base station.

BACKGROUND

In a Long Term Evolution (LTE) system, a base station transmits a broadcast by covering a whole sector with a beam. In New Radio (NR), the base station can cover a sector by narrow beam scanning, that is, the base station transmits only a narrow beam in a certain direction at a certain moment, and then continuously changes the direction of the beam to reach and cover a sector. This type of scenario is called a multi-beam scenario.

In a multi-beam scenario, user equipment (UE) first correlates to the best downlink beam by measuring downlink signals. For UE having a transmission-reception (Tx-Rx) correspondence capability, the UE can determine the most suitable uplink beam by receiving the downlink beam. However, for UE that does not have the Tx-Rx correspondence capability, the UE may not determine its own uplink beam, which requires the UE to try to transmit by using different beams to determine the most suitable uplink beam.

For random access, the UE that does not have the Tx-Rx correspondence capability can ensure that the base station receives a preamble by transmitting multiple preambles, which is multi-preamble transmission in a multi-beam scenario.

SUMMARY

According to a first aspect of the present disclosure, there is provided a random access method for user equipment (UE), including: determining to initiate random access; judging whether or not to use multi-preamble transmission; and when determining to use multi-preamble transmission, transmitting a preamble through an acquired multi-preamble transmission opportunity, to perform random access.

According to a second aspect of the present disclosure, there is provided a random access method, including: receiving a preamble transmitted by user equipment (UE) through a multi-preamble transmission opportunity; and returning, according to a time-frequency resource location in the multi-preamble transmission opportunity in which the received preamble is located, a random access response (RAR) for the preamble and for the time-frequency resource location in the multi-preamble transmission opportunity, for the UE to perform random access.

According to a third aspect of the present disclosure, there is provided user equipment, including: a processor; and a memory for storing instructions executable by the processor; wherein the processor is configured to: determine to initiate random access; judge whether or not to use multi-preamble transmission; and when determining to use multi-preamble transmission, transmit a preamble through an acquired multi-preamble transmission opportunity, to perform random access.

According to a fourth aspect of the present disclosure, there is provided a base station, including: a processor; and a memory for storing instructions executable by the processor; wherein the processor is configured to: receive a preamble transmitted by user equipment (UE) through a multi-preamble transmission opportunity; and return, according to a time-frequency resource location in the multi-preamble transmission opportunity in which the received preamble is located, a random access response (RAR) for the preamble and for the time-frequency resource location in the multi-preamble transmission opportunity, for the UE to perform random access.

According to a fifth aspect of the present disclosure, there is provided a computer readable storage medium having stored thereon a computer program, wherein the program is executed by a processor to perform the random access method according to the first aspect.

According to a sixth aspect of the present disclosure, there is provided a computer readable storage medium having stored thereon a computer program, wherein the program is executed by a processor to perform the random access method according to the second aspect.

The technical solutions provided by the embodiments of the present disclosure can include the following beneficial effects.

It is determined whether the UE can use multi-preamble transmission by judging whether to use multi-preamble transmission. If it is determined that the UE can use multi-preamble transmission, the preamble is transmitted through a multi-preamble transmission opportunity, thereby saving limited multi-preamble transmission resources.

It should be understood that both the above general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Exemplary embodiments will be described in detail herein, with reference to the accompanying drawings. When the following description refers to the drawings, the same numbers in different drawings represent the same or similar elements unless otherwise indicated. The embodiments described in the following exemplary embodiments do not represent all embodiments consistent with the present disclosure. Rather, they are merely examples of apparatuses and methods consistent with some aspects of the present disclosure as recited in the appended claims.

Figure 1:
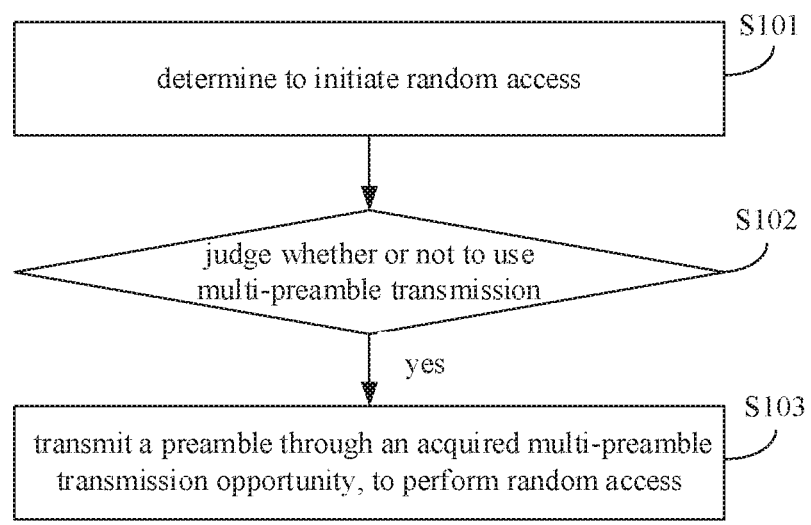
FIG. 1 is a flowchart of a random access method according to an exemplary embodiment.

FIG. 1 is a flowchart of a random access method according to an exemplary embodiment. The random access method may be performed by user equipment (UE). As shown in FIG. 1, the random access method includes the following steps.

In step S101, it is determined to initiate random access.

For example, when the UE has uplink data to be transmitted, it may be necessary to initiate random access.

In step S102, it is judged whether or not to use multi-preamble transmission.

In this embodiment, the UE may use, but is not limited to, one or more of the following manners to judge whether the UE uses multi-preamble transmission.

In a first manner, it is judged whether the service that triggers the random access is a preset type of service, and if it is a preset type of service, it may be determined to use multi-preamble transmission.

The preset type of service may include, but is not limited to, a delay sensitive service, such as an Ultra Reliable Low Latency Communication (URLLC) service.

In a second manner, it is judged whether the multi-preamble transmission function is enabled. If the multi-preamble transmission function is enabled, it may be determined to use multi-preamble transmission.

Whether the multi-preamble transmission function is enabled may be judged by, but not limited to, any one of the following manners.

For example, if the physical random access channel (PRACH) resource of the multi-preamble transmission is configured in a received system message, the multi-preamble transmission function of the UE is enabled.

Also for example, if the UE is in a disabled state or a connected state and the base station configuration turns on the multi-preamble transmission function of the UE, the multi-preamble transmission function of the UE is enabled.

As another example, if the base station configuration turns on a data bearer (DRB) of the UE or a multi-preamble transmission function of a logical channel, and the random access is triggered by the DRB or the logical channel that has the multi-preamble transmission function turned on, and the random access is competitive random access, the multi-preamble transmission function of the UE is enabled.

In a third manner, it is judged whether the UE determines to transmit an uplink beam of the preamble. If the UE does not determine to transmit an uplink beam of the preamble, it may be determined to use multi-preamble transmission.

In a fourth manner, it is judged whether the UE is a preset type of UE, and if the UE is a preset type of UE, it may be determined to use multi-preamble transmission.

For example, if the UE type indicated in the received PRACH resource of the multi-preamble transmission from the base station is a preset type, it may be determined that the UE is a preset type of UE.

The preset type of UE may include but is not limited to an internet terminal.

In a fifth manner, it is judged whether the random access is a preset access type, and if the random access is a preset access type, it may be determined to use multi-preamble transmission.

For example, if the received access type indicated in the PRACH resource of multi-preamble transmission from the base station is a preset access type, it is determined that the random access is a preset access type.

In a sixth manner, it is judged whether the UE has a multiple input multiple output (MIMO) capability or a multi-beam transmission capability. If the UE has a MIMO capability or a multi-beam transmission capability, it may be determined to use multi-preamble transmission.

In a seventh manner, it is judged whether the UE has the Tx-Rx correspondence capability. If the UE does not have a Tx-Rx correspondence capability, it may be determined to use multi-preamble transmission.

In step S103, if it is determined to use multi-preamble transmission, the preamble is transmitted through an acquired multi-preamble transmission opportunity, to perform random access.

Figure 2A:
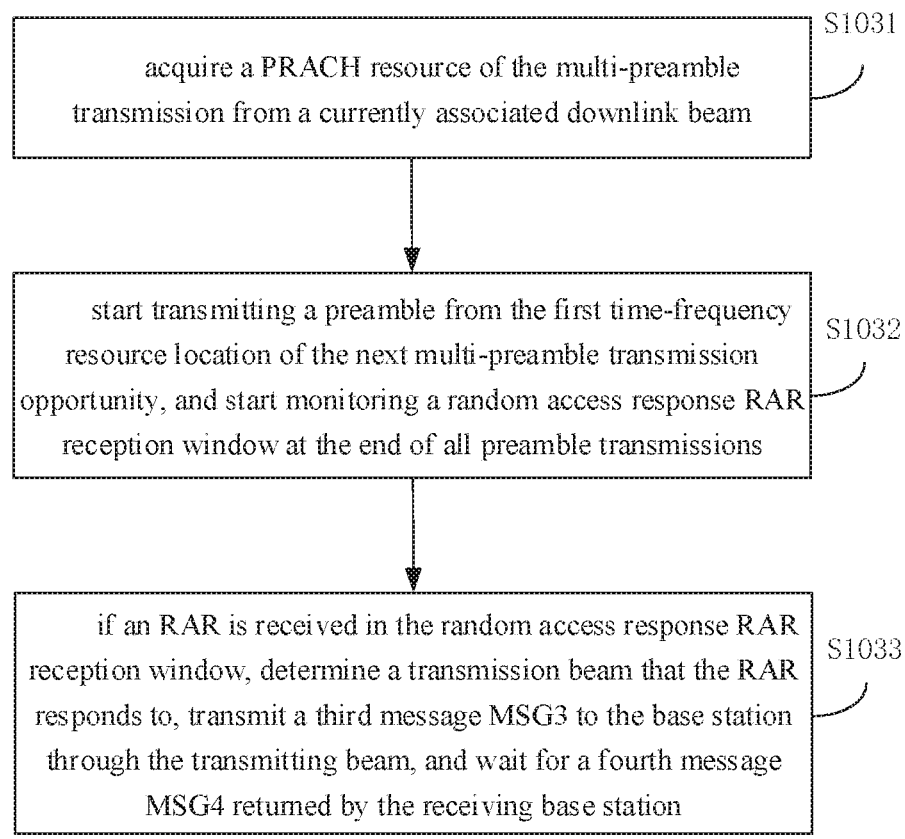
FIG. 2A is a flowchart of a random access method according to an exemplary embodiment.

FIG. 2A is a flowchart of a random access method according to an exemplary embodiment. In FIG. 2A, the step of transmitting the preamble through the acquired multi-preamble transmission opportunity to perform random access further includes the following steps.

In step S1031, the PRACH resource of the multi-preamble transmission is acquired from a currently associated downlink beam, wherein the PRACH resource is used to indicate a multi-preamble transmission opportunity.

Figure 2B:
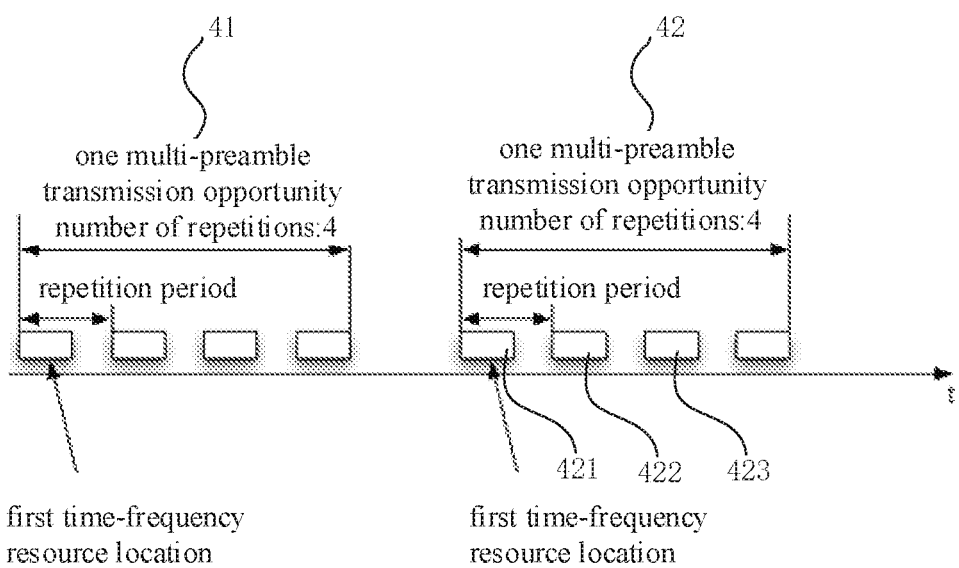
FIG. 2B is a schematic diagram of a multi-preamble transmission opportunity according to an exemplary embodiment.

The multi-preamble transmission opportunity may include a starting time-frequency resource location, a repetition period, and a number of repetitions of the PRACH. For example, FIG. 2B is a schematic diagram showing the starting time-frequency resource location, the repetition period and the number of repetitions of the PRACH of one multi-preamble transmission opportunity, which will be further described below.

In step S1032, transmitting the preamble is started from the first time-frequency resource location of the next multi-preamble transmission opportunity, and monitoring a random access response (RAR) reception window is started at the end of all preamble transmissions.

The starting location of the RAR reception window is at a predetermined interval, for example, is turned on at 1 subframe since the end of the multi-preamble transmission opportunity.

In this embodiment, transmitting the preamble from the first time-frequency resource location of the next multi-preamble transmission opportunity may include: selecting a preamble from a preamble resource pool, and starting to transmit the selected preamble from the first time-frequency resource location of the next multi-preamble transmission opportunity; if the number of transmission beams supported by the UE is less than the number of repetitions, transmitting the selected preamble at a first preset number of time-frequency resource locations after the first time-frequency resource location, or repeatedly transmitting a second preset number of transmission beams, wherein the first preset number is equal to the number of transmission beams minus one, and the second preset number is equal to a difference between the number of repetitions and the number of transmission beams; if the number of transmission beams supported by the UE is greater than the number of repetitions, transmitting the selected preamble by selecting the same number of transmission beams as the number of repetitions.

The multi-preamble transmission opportunity shown in FIG. 2B is taken as an example. The number of repetitions of the PRACH resource of one preamble transmission opportunity in FIG. 2B is 4, and it is assumed that the UE is currently in a multi-preamble transmission opportunity 41. Then, after selecting one preamble from the preamble resource pool, the UE may start transmitting the selected preamble from the first time-frequency resource location 421 of the next multi-preamble transmission opportunity, i.e. a multi-preamble transmission opportunity 42. If the number of transmission beams supported by the UE is 3, that is, the number of transmission beams supported by the UE is less than the number of repetitions, the selected preamble is transmitted on two time-frequency resource locations after the first time-frequency resource location 421, that is, at a time-frequency resource location 422 and a time-frequency resource location 423, or one transmission beam is repeatedly transmitted. If the number of transmission beams supported by the UE is 5, greater than the number of repetitions of 4, then 4 transmission beams are selected to transmit the selected preamble.

In step S1033, if an RAR is received in the RAR reception window, a transmission beam that the RAR responds to is determined, a third message (MSG3) is transmitted to the base station through the transmitting beam, and a fourth message (MSG4) returned by the receiving base station is waited for.

In this embodiment, after receiving an RAR in the RAR reception window, a transmission beam that the RAR responds to may be determined according to a random access radio network temporary identifier (RA-RNTI) corresponding to the RAR, and then a MSG3 is transmitted to the base station through the transmission beam, and a MSG4 returned by the receiving base station is waited for.

In this embodiment, after determining to use multi-preamble transmission, the preamble is transmitted from the first time-frequency resource location of the next multi-preamble transmission opportunity, and the RAR reception window is monitored at the end of all preamble transmissions, and then a transmission beam that the RAR responds to is determined, a MSG3 is transmitted to the base station through the transmission beam, and a MSG4 returned by the receiving base station is waited for, thereby completing the random access procedure.

In the above embodiment, it is determined whether the UE can use multi-preamble transmission by judging whether to use multi-preamble transmission. If it is determined that the UE can use multi-preamble transmission, the preamble is transmitted through a multi-preamble transmission opportunity, thereby saving limited multi-preamble transmission resources.

Figure 3:
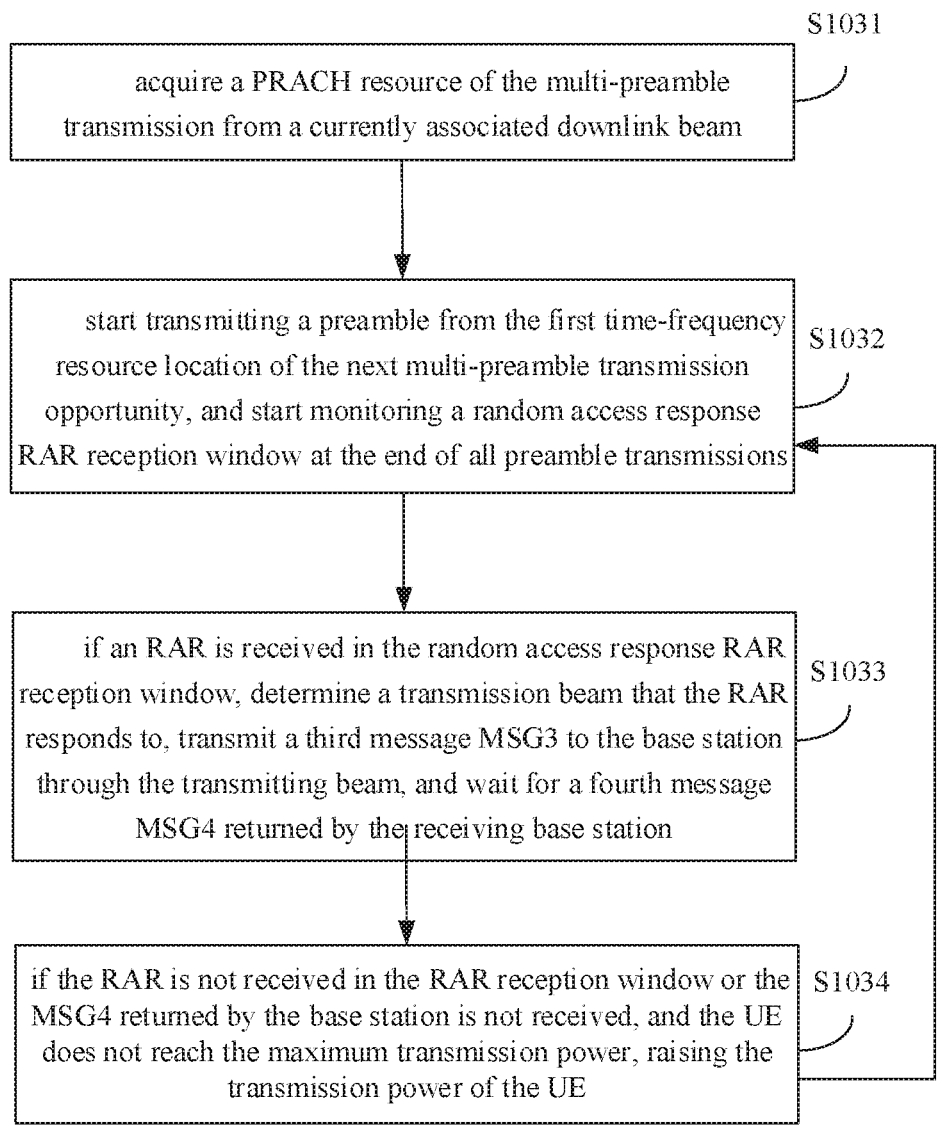
FIG. 3 is a flowchart of a random access method according to an exemplary embodiment.

FIG. 3 is a flowchart of a random access method according to an exemplary embodiment. As shown in FIG. 3, after the above step S1033, the method may further include the following step.

In step S1034, if the RAR is not received in the RAR reception window or the MSG4 returned by the base station is not received, and the UE does not reach the maximum transmission power, the transmission power of the UE is raised, and the process proceeds to step S1032.

In this embodiment, the UE transmits the same preamble in one multi-preamble transmission opportunity, and after completing one multi-preamble transmission, if the RAR is not received in the RAR reception window or the MSG4 returned by the base station is not received, and if the UE does not reach the maximum transmission power, the transmission power of the UE may be raised to try to receive the RAR or the MSG4, so that random access can be implemented.

In the above embodiment, if the RAR is not received in the RAR reception window or the MSG4 returned by the base station is not received, and the UE does not reach the maximum transmission power, the transmission power of the UE may be raised to try to receive the RAR or MSG4, thereby increasing the probability to implement the random access.

Figure 4:
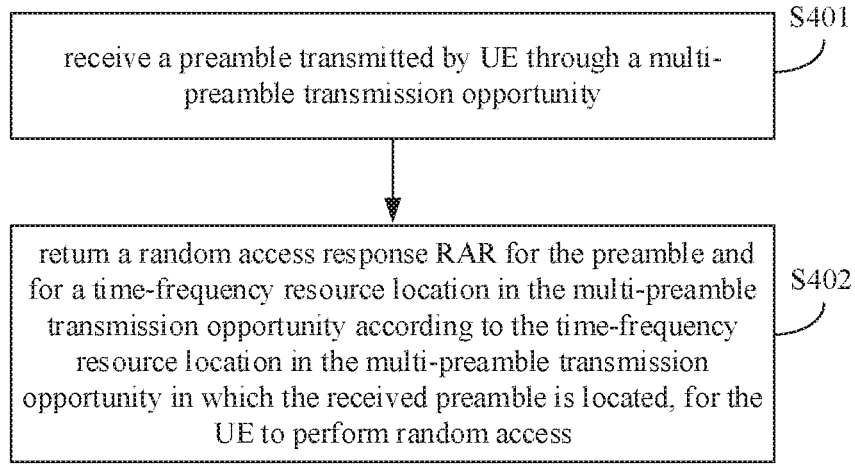
FIG. 4 is a flowchart of a random access method according to an exemplary embodiment.

FIG. 4 is a flowchart of a random access method according to an exemplary embodiment of the present application. The random access method may be performed by a base station. As shown in FIG. 4, the random access method includes the following steps.

In step S401, a preamble transmitted by UE through a multi-preamble transmission opportunity is received.

The multi-preamble transmission opportunity may include a starting time-frequency resource location, a repetition period, and a number of repetitions of the PRACH. For example, FIG. 2B is a schematic diagram showing the starting time-frequency resource location, the repetition period and the number of repetitions of the PRACH of one multi-preamble transmission opportunity.

In this embodiment, after the UE determines to use multi-preamble transmission, the UE may transmit the preamble through an acquired multi-preamble transmission opportunity, and the base station receives the preamble transmitted by the UE through the multi-preamble transmission opportunity.

In step S402, an RAR for the preamble and for the time-frequency resource location in the multi-preamble transmission opportunity is returned according to the time-frequency resource location in the multi-preamble transmission opportunity in which the received preamble is located, for the UE to perform random access.

In this embodiment, the RAR fed back by the base station is based on the time-frequency resource location in the multi-preamble transmission opportunity in which the received preamble is located. The time-frequency resource location where the preamble is located may be represented by RA-RNTI. The calculation of the RA-RNTI may take into account an Orthogonal Frequency Division Multiplexing (OFDM) symbol and the like in which the preamble is located. The base station feeds back the RAR for the RA-RNTI, and the RAR includes the preamble identifier (ID) transmitted by the RA-RNTI. Generally, if a base station receives a preamble in an RA-RNTI, it will feed back an RAR to the RA-RNTI, but the base station does not have to respond with an RAR to all received preambles, depending on whether the base station is currently in a busy service state.

Figure 5:
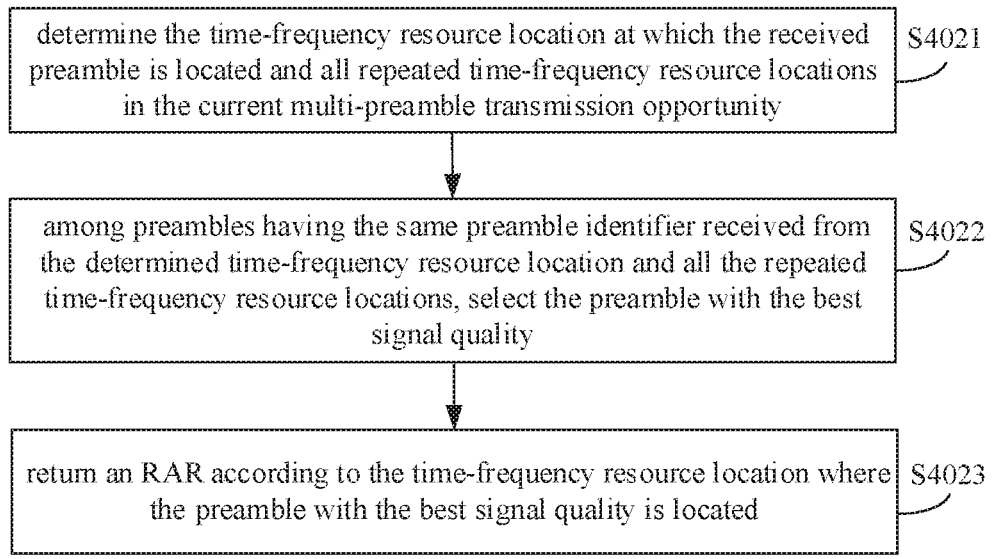
FIG. 5 is a flowchart of a return random access response according to an exemplary embodiment.

As shown in FIG. 5, the step S402 may include the following steps.

In step S4021, the time-frequency resource location at which the received preamble is located and all repeated time-frequency resource locations in the current multi-preamble transmission opportunity are determined.

It is assumed that after selecting a preamble from the preamble resource pool, the UE may start transmitting the selected preamble from the next multi-preamble transmission opportunity, for example, the first time-frequency resource location 421 of the multi-preamble transmission opportunity 42 shown in FIG. 2B. If the number of transmission beams supported by the UE is 3, that is, the number of transmission beams supported by the UE is less than the number of repetitions, the selected preamble is transmitted on two time-frequency resource locations after the first time-frequency resource location 421, that is, at a time-frequency resource location 422 and a time-frequency resource location 423. After receiving the preamble, the base station may determine that the time-frequency resource location at which the received preamble is located and all repeated time-frequency resource locations in the current multi-preamble transmission opportunity are respectively the first time-frequency resource location 421 and the time-frequency resource locations 422 and 423.

In step S4022, among preambles having the same preamble identifier received from the determined time-frequency resource location and all the repeated time-frequency resource locations, the preamble with the best signal quality is selected.

The UE selects the preamble with the best signal quality from the preambles with the same preamble identifier received at the first time-frequency resource location 421 and the time-frequency resource locations 422 and 423.

In step S4023, an RAR is returned according to the time-frequency resource location where the preamble with the best signal quality is located, where the RAR carries the preamble identifier corresponding to the preamble with the best signal quality.

The time-frequency resource location where the preamble with the best signal quality is located may include at least one of an OFDM symbol location, a subframe location, and a frequency domain location where the preamble with the best signal quality is located. At least one of an OFDM symbol location, a subframe location, and a frequency domain location where the preamble with the best signal quality is located may be represented by an RA-RNTI.

After determining the preamble with the best signal quality, an RAR may be returned according to the time-frequency resource location where the preamble with the best signal quality is located, for the UE to determine a transmission beam that the RAR responds to.

In this embodiment, by selecting a preamble with the best signal quality and returning an RAR according to the time-frequency resource location where the best preamble of the signal quality is located, it can save resource consumption.

In the above embodiment, the preamble transmitted by the UE through a multi-preamble transmission opportunity is received, and an RAR for the preamble and for the time-frequency resource location in the multi-preamble transmission opportunity is returned according to the time-frequency resource location in the multi-preamble transmission opportunity in which the received preamble is located, for the UE to perform random access. Thereby, it can achieve the objective of providing transmission resource for a qualified UE and saving transmission resources.

Figure 6:
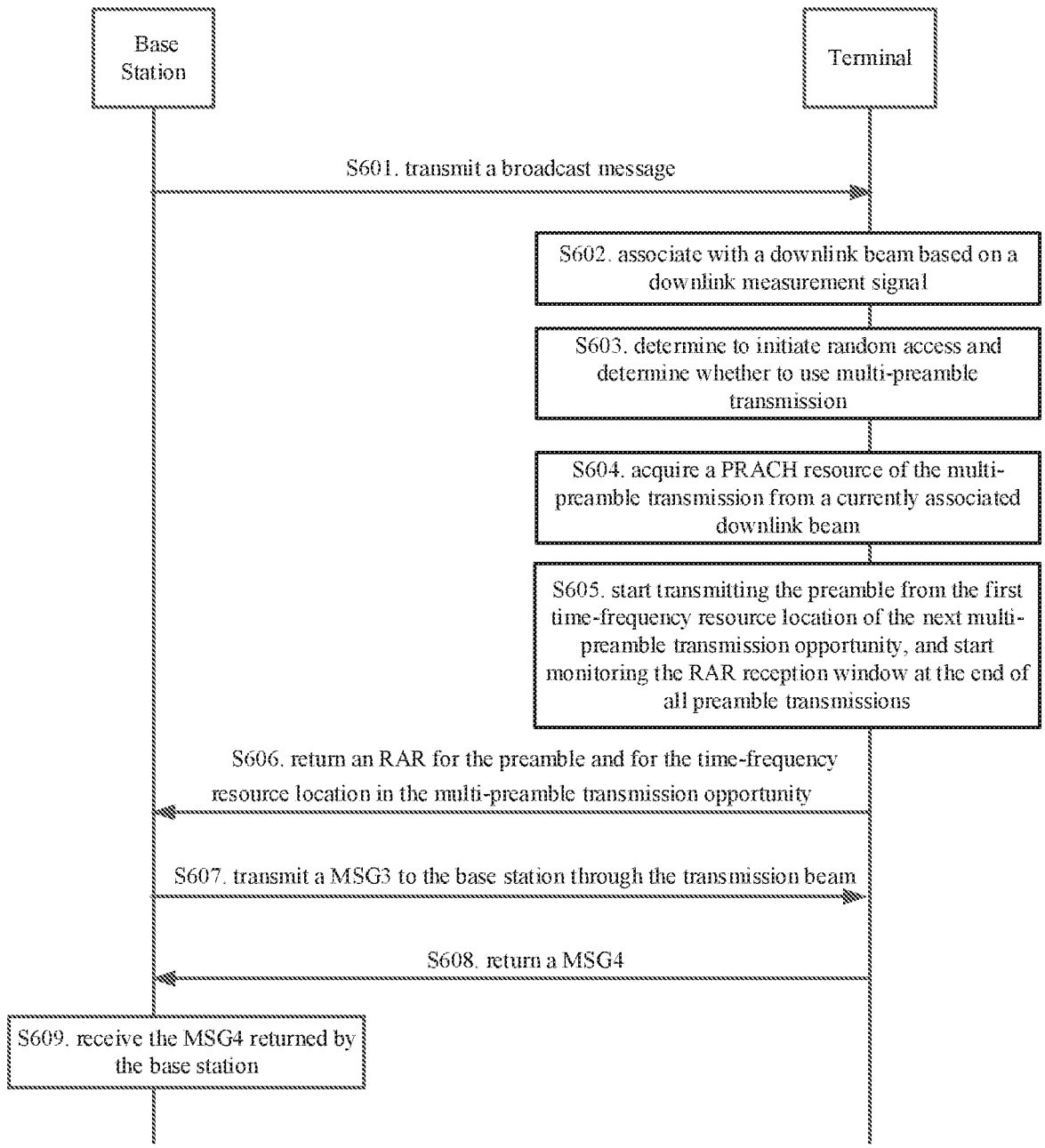
FIG. 6 is a signaling flowchart of a random access method according to an exemplary embodiment.

FIG. 6 is a flowchart of a random access method according to an exemplary embodiment. The method may be performed by UE and a base station. As shown in FIG. 6, the random access method includes the following steps.

In step S601, the base station transmits a broadcast message to the UE, wherein the broadcast message carries a PRACH resource for multi-preamble transmission of each beam.

The PRACH resource is used to indicate a multi-preamble transmission opportunity, and the dedicated PRACH resource of multi-preamble transmission of each beam is different. The multi-preamble transmission opportunity may include a starting time-frequency resource location, a repetition period, and a number of repetitions of the PRACH. In addition, the PRACH resource may further include a preamble identifier. Further, the PRACH resource may further include a size of the RAR reception window.

In step S602, the UE is associated with a downlink beam based on a downlink measurement signal.

In step S603, the UE determines to initiate random access and judges whether to use multi-preamble transmission.

In step S604, the UE determines to use multi-preamble transmission, and acquires a PRACH resource of the multi-preamble transmission from a currently associated downlink beam, where the PRACH resource is used to indicate a multi-preamble transmission opportunity.

In step S605, the UE starts transmitting the preamble from the first time-frequency resource location of the next multi-preamble transmission opportunity, and starts monitoring the RAR reception window at the end of all preamble transmissions.

In step S606, the base station receives the preamble transmitted by the UE, and returns an RAR for the preamble and for the time-frequency resource location in the multi-preamble transmission opportunity according to the time-frequency resource location in the multi-preamble transmission opportunity in which the received preamble is located.

In step S607, if the UE receives the RAR in the RAR reception window, it determines the transmission beam that the RAR responds to, and transmits the MSG3 to the base station through the transmission beam.

In step S608, the base station receives the MSG3 transmitted by the UE, and returns a MSG4 to the UE.

In step S609, the UE receives the MSG4 returned by the base station.

In the above embodiment, through the interaction between the UE and the base station, the UE determines whether it can use multi-preamble transmission by judging whether to use multi-preamble transmission, and when determining that the UE can use multi-preamble transmission, the UE uses a multi-preamble transmission opportunity provided by the base station to transmit the preamble. After receiving the preamble transmitted by the UE through the multi-preamble transmission opportunity, the base station may return an RAR for the preamble and for the time-frequency resource location in the multi-preamble transmission opportunity according to the time-frequency resource location in the multi-preamble transmission opportunity in which the received preamble is located, for the UE to perform random access. Thereby, it can achieve the objective of providing transmission resource for the UE and saving transmission resources.

Figure 7:
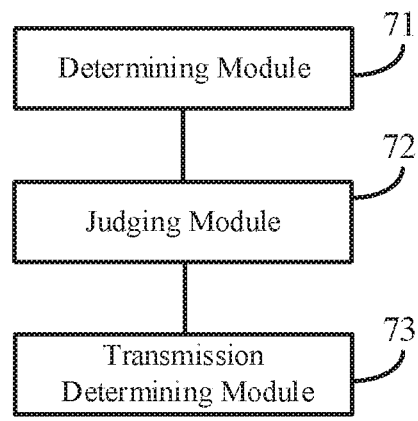
FIG. 7 is a block diagram of a random access device according to an exemplary embodiment.

FIG. 7 is a block diagram of a random access device according to an exemplary embodiment. As shown in FIG. 7, the random access device includes a determining module 71, a judging module 72, and a transmission determining module 73.

The determination module 71 is configured to determine to initiate random access.

For example, when the UE has uplink data to transmit, it may be necessary to initiate random access.

The judging module 72 is configured to judge whether or not to use multi-preamble transmission after the determining module 71 determines to initiate random access.

The transmission determining module 73 is configured to, if the judging module 72 determines to use multi-preamble transmission, transmit the preamble through an acquired multi-preamble transmission opportunity, to perform random access.

In the above embodiment, it is determined whether the UE can use multi-preamble transmission by judging whether to use multi-preamble transmission. If it is determined that the UE can use multi-preamble transmission, the preamble is transmitted through a multi-preamble transmission opportunity, thereby saving limited multi-preamble transmission resources.

Figure 8A:
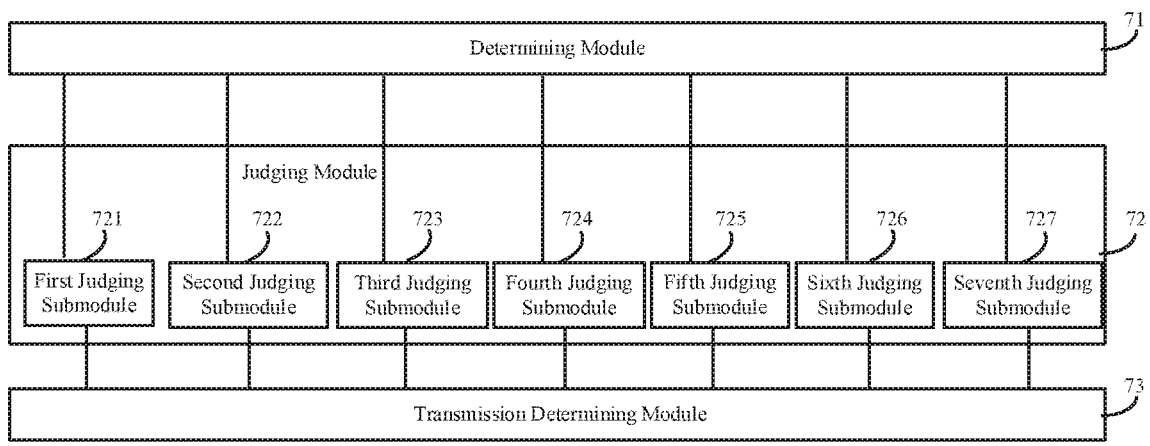
FIG. 8A is a block diagram of a random access device according to an exemplary embodiment.

FIG. 8A is a block diagram of a random access device according to an exemplary embodiment. As shown in FIG. 8A, on the basis of the above embodiment shown in FIG. 7, the judging module 72 may include at least one of the following submodule: a first judging submodule 721, a second judging submodule 722, a third judging submodule 723, a fourth judging submodule 724, a fifth judging submodule 725, a sixth judging submodule 726, and a seventh judging submodule 727.

The first judging submodule 721 is configured to judge whether the service that triggers the random access is a preset type of service, and if it is a preset type of service, determine to use multi-preamble transmission.

The preset type of service may include, but not limited to, a delay sensitive service, such as an Ultra Reliable Low Latency Communication (URLLC) service.

The second judging submodule 722 is configured to judge whether the multi-preamble transmission function is enabled, and if the multi-preamble transmission function is enabled, determine to use multi-preamble transmission.

Whether the multi-preamble transmission function is enabled may be judged by, but not limited to, any one of the following manners.

For example, if the physical random access channel PRACH resource of the multi-preamble transmission is configured in a received system message, the multi-preamble transmission function of the UE is enabled.

Also for example, if the UE is UE in a disabled state or a connected state and the base station configuration turns on the multi-preamble transmission function of the UE, the multi-preamble transmission function of the UE is enabled.

As another example, if the base station configuration turns on a data bearer (DRB) of the UE or a multi-preamble transmission function of a logical channel, and the random access is triggered by the DRB or the logical channel that has the multi-preamble transmission function turned on, and the random access is competitive random access, the multi-preamble transmission function of the UE is enabled.

The third judging submodule 723 is configured to judge whether the UE determines to transmit an uplink beam of the preamble, and if the UE does not determine to transmit an uplink beam of the preamble, determine to use multi-preamble transmission.

The fourth judging submodule 724 is configured to judge whether the UE is a preset type of UE, and if the UE is a preset type of UE, determine to use multi-preamble transmission.

For example, if the UE type indicated in the received PRACH resource of the multi-preamble transmission from the base station is a preset type, it may be determined that the UE is a preset type of UE.

The preset type of UE may include but not limited to an internet terminal.

The fifth judging submodule 725 is configured to judge whether the random access is a preset access type, and if the random access is a preset access type, determine to use multi-preamble transmission.

For example, if the received access type indicated in the PRACH resource of multi-preamble transmission from the base station is a preset access type, it is determined that the random access is a preset access type.

The sixth judging submodule 726 is configured to judge whether the UE has a multiple input multiple output (MIMO) capability or a multi-beam transmission capability, and if the UE has a MIMO capability or a multi-beam transmission capability, determine to use multi-preamble transmission.

The seventh judging submodule 727 is configured to judge whether the UE has the Tx-Rx correspondence capability, and if the UE does not have a Tx-Rx correspondence capability, determine to use multi-preamble transmission.

In the above embodiment, whether the UE uses multi-preamble transmission can be determined in multiple manners, and the implementation manner is flexible and diverse.

Figure 8B:
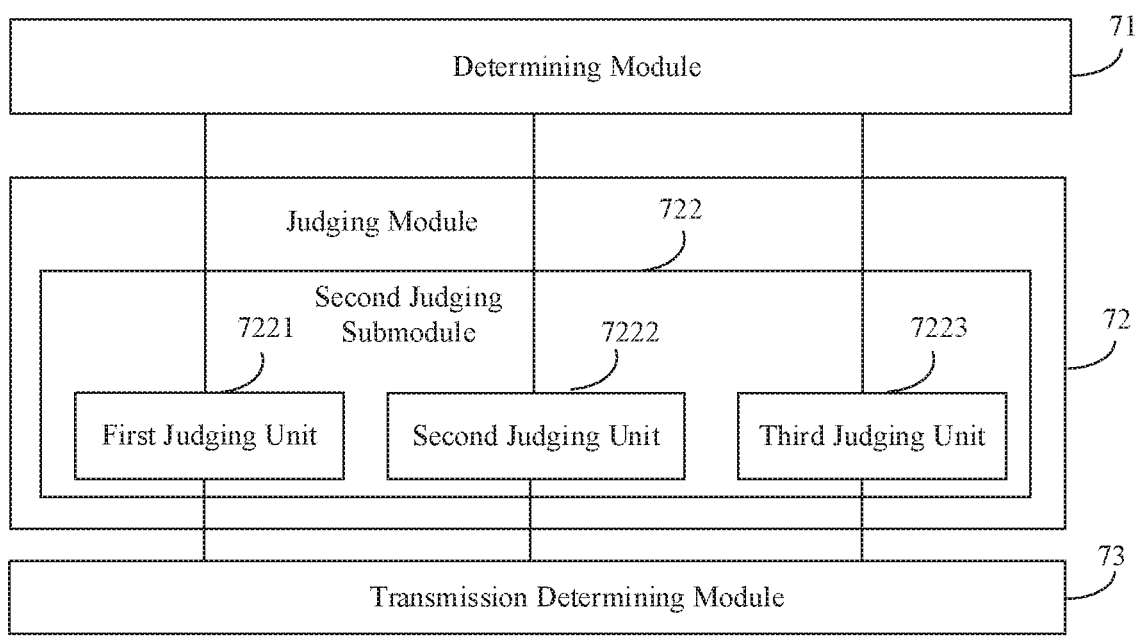
FIG. 8B is a block diagram of a random access device according to an exemplary embodiment.

FIG. 8B is a block diagram of a random access device according to an exemplary embodiment. As shown in FIG. 8B, based on the above embodiment shown in FIG. 8A, the second judging submodule 722 may include a first judging unit 7221, a second judging unit 7222, or a third judging unit 7223.

The first judging unit 7221 is configured to, if the physical random access channel PRACH resource of the multi-preamble transmission is configured in a received system message, determine that the multi-preamble transmission function of the UE is enabled.

The second judging unit 7222 is configured to, if the UE is UE in a disabled state or a connected state and the base station configuration turns on the multi-preamble transmission function of the UE, determine that the multi-preamble transmission function of the UE is enabled.

The third judging unit 7223 is configured to, if the base station configuration turns on a data bearer (DRB) of the UE or a multi-preamble transmission function of a logical channel, and the random access is triggered by the DRB or the logical channel that has the multi-preamble transmission function turned on, and the random access is competitive random access, determine that the multi-preamble transmission function of the UE is enabled.

In the above embodiment, whether the multi-preamble transmission function is enabled or not can be determined in various manners, and the implementation manner is flexible and diverse.

Figure 8C:
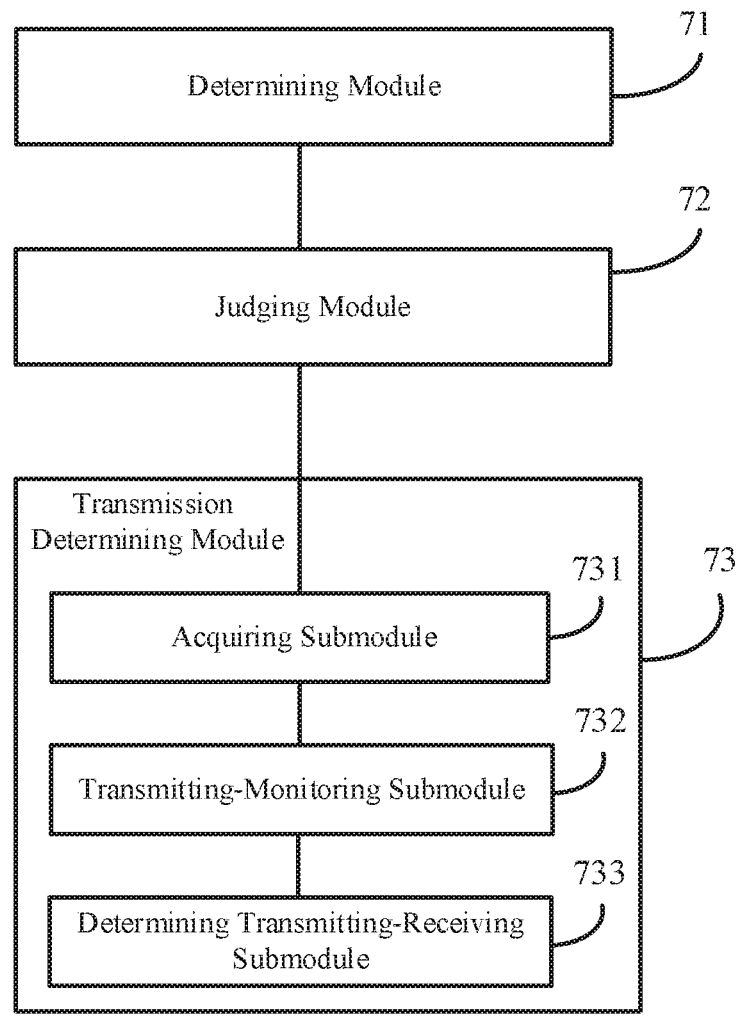
FIG. 8C is a block diagram of a random access device according to an exemplary embodiment.

FIG. 8C is a block diagram of a random access device according to an exemplary embodiment. As shown in FIG. 8C, on the basis of the above embodiment shown in FIG. 7, the transmission determining module 73 may include: an acquiring submodule 731, a transmitting-monitoring submodule 732, and a determining-transmitting-receiving submodule 733.

The acquiring submodule 731 is configured to acquire a PRACH resource of the multi-preamble transmission from a currently associated downlink beam, where the PRACH resource is used to indicate a multi-preamble transmission opportunity.

The multi-preamble transmission opportunity may include a starting time-frequency resource location, a repetition period, and a number of repetitions of the PRACH. For example, FIG. 2B is a schematic diagram showing the starting time-frequency resource location, the repetition period and the number of repetitions of the PRACH of one multi-preamble transmission opportunity.

The transmitting-monitoring submodule 732 is configured to start transmitting a preamble from the first time-frequency resource location of the next multi-preamble transmission opportunity indicated by the PRACH resource acquired by the acquiring submodule 731, and start monitoring a random access response (RAR) reception window at the end of all preamble transmissions.

The starting location of the RAR reception window is at a predetermined interval, for example, is turned on at 1 subframe since the end of the multi-preamble transmission opportunity.

The determining-transmitting-receiving submodule 733 is configured to, if the transmitting-monitoring submodule 732 receives an RAR in the random access response RAR reception window, determine a transmission beam that the RAR responds to, transmit a third message (MSG3) to the base station through the transmitting beam, and wait for a fourth message (MSG4) returned by the receiving base station.

In this embodiment, after receiving an RAR in the RAR reception window, a transmission beam that the RAR responds to may be determined according to a random access radio network temporary identifier (RA-RNTI) corresponding to the RAR, and then a MSG3 is transmitted to the base station through the transmission beam, and a MSG4 returned by the receiving base station is waited for.

In the above embodiment, after determining to use multi-preamble transmission, the preamble is transmitted from the first time-frequency resource location of the next multi-preamble transmission opportunity, and the RAR reception window is monitored at the end of all preamble transmissions, and then a transmission beam that the RAR responds to is determined, a MSG3 is transmitted to the base station through the transmission beam, and a MSG4 returned by the receiving base station is waited for, thereby completing the random access procedure.

Figure 8D:
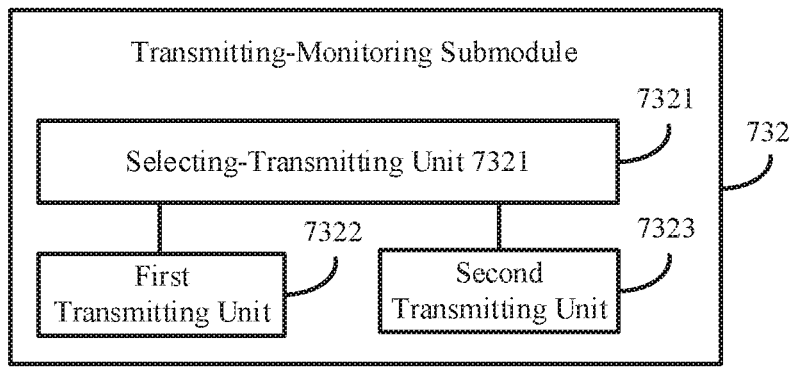
FIG. 8D is a block diagram of a random access device according to an exemplary embodiment.

FIG. 8D is a block diagram of a random access device according to an exemplary embodiment. As shown in FIG. 8D, on the basis of the above embodiment shown in FIG. 8C, a multi-preamble transmission opportunity includes a starting time-frequency resource location, a repetition period, and a number of repetitions of the PRACH. The transmitting-monitoring submodule 732 may include a selecting-transmitting unit 7321, a first transmitting unit 7322, and a second transmitting unit 7323.

The selecting-transmitting unit 7321 is configured to select a preamble from a preamble resource pool, and start transmitting the selected preamble from the first time-frequency resource location of the next multi-preamble transmission opportunity.

The first transmitting unit 7322 is configured to, if the number of transmission beams supported by the UE is less than the number of repetitions, transmit the selected preamble at a first preset number of time-frequency resource locations after the first time-frequency resource location, or repeatedly transmit a second preset number of transmission beams, where the first preset number is equal to the number of transmission beams minus one, and the second preset number is equal to a difference between the number of repetitions and the number of transmission beams.

The second transmitting unit 7323 is configured to, if the number of transmission beams supported by the UE is greater than the number of repetitions, transmit the preamble selected by the selecting-transmitting unit 7321 by selecting the same number of transmission beams as the number of repetitions.

The multi-preamble transmission opportunity shown in FIG. 2B is taken as an example. The number of repetitions of the PRACH resource of one preamble transmission opportunity in FIG. 2B is 4, and it is assumed that the UE is currently in a multi-preamble transmission opportunity 41. Then, after selecting one preamble from the preamble resource pool, the UE may start transmitting the selected preamble from the first time-frequency resource location 421 of the next multi-preamble transmission opportunity, i.e. a multi-preamble transmission opportunity 42. If the number of transmission beams supported by the UE is 3, that is, the number of transmission beams supported by the UE is less than the number of repetitions, the selected preamble is transmitted on two time-frequency resource locations after the first time-frequency resource location 421, that is, at a time-frequency resource location 422 and a time-frequency resource location 423, or one transmission beam is repeatedly transmitted. If the number of transmission beams supported by the UE is 5, greater than the number of repetitions of 4, then 4 transmission beams are selected to transmit the selected preamble.

In the above embodiment, the selected preamble is transmitted from the first time-frequency resource location of the next multi-preamble transmission opportunity, and the time-frequency resource location for transmitting the preamble is selected according to the size relationship between the number of transmission beams supported by the UE and the number of repetitions, so that the base station can return an RAR at the time-frequency resource location where the received preamble is located.

Figure 8E:
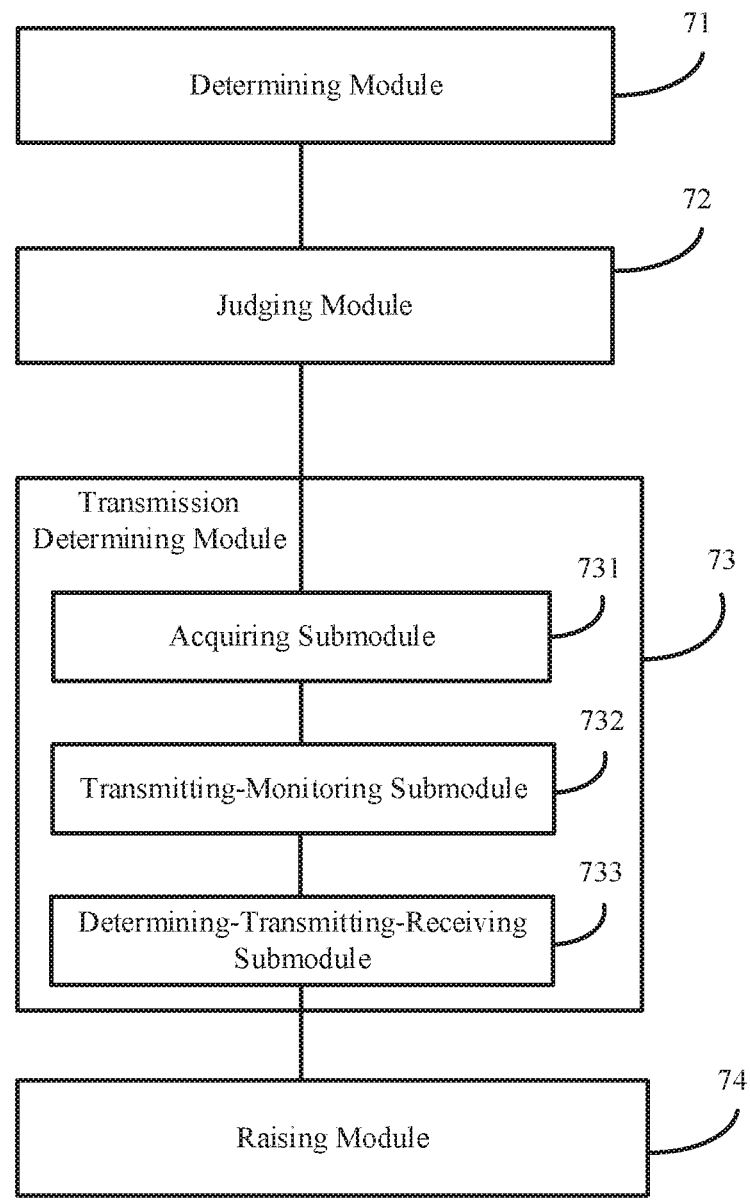
FIG. 8E is a block diagram of a random access device according to an exemplary embodiment.

FIG. 8E is a block diagram of a random access device according to an exemplary embodiment. As shown in FIG. 8E, on the basis of the embodiment shown in FIG. 8C, the device may further include a raising module 74.

The raising module 74 is configured to, if the RAR is not received in the RAR reception window or the MSG4 returned by the base station is not received by the determining-transmitting-receiving submodule 733, and the UE does not reach the maximum transmission power, raise the transmission power of the UE, and invoke the transmitting-monitoring submodule 732 to start transmitting the preamble from the first time-frequency resource location of the next multi-preamble transmission opportunity.

In this embodiment, the UE transmits the same preamble in one multi-preamble transmission opportunity, and after completing one multi-preamble transmission, if the RAR is not received in the RAR reception window or the MSG4 returned by the base station is not received, and if the UE does not reach the maximum transmission power, the transmission power of the UE may be raised to try to receive the RAR or the MSG4, so that random access can be implemented.

In the above embodiment, if the RAR is not received in the RAR reception window or the MSG4 returned by the base station is not received, and the UE does not reach the maximum transmission power, the transmission power of the UE may be raised to try to receive the RAR or MSG4, thereby increasing the probability to implement the random access.

Figure 8F:
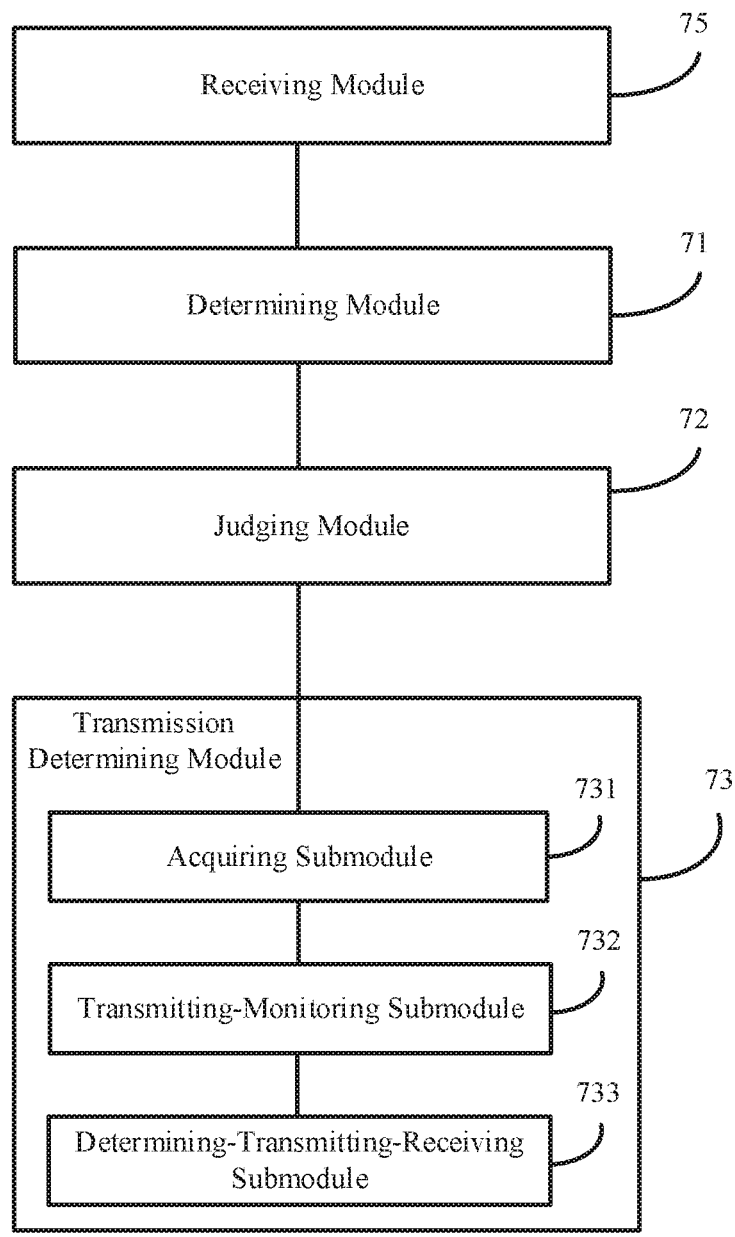
FIG. 8F is a block diagram of a random access device according to an exemplary embodiment.

FIG. 8F is a block diagram of a random access device according to an exemplary embodiment. As shown in FIG. 8F, on the basis of the above embodiment shown in FIG. 7, the device may further include a receiving module 75.

The receiving module 75 is configured to receive a broadcast message transmitted by the base station before the judging module 72 judges whether to use multi-preamble transmission, where the broadcast message carries a PRACH resource for multi-preamble transmission of each beam.

The PRACH resource is used to indicate a multiple preamble transmission opportunity, and the dedicated PRACH resource of multiple preamble transmission of each beam is different. The multi-preamble transmission opportunity may include a starting time-frequency resource location, a repetition period, and a number of repetitions of the PRACH. In addition, optionally, the PRACH resource may further include a preamble identifier. Further, the PRACH resource may further include a size of the RAR reception window.

In the above embodiment, by receiving a broadcast message transmitted by the base station, it provides a possibility for subsequently transmitting a preamble according to the PRACH resource carried in the broadcast message.

Figure 8G:
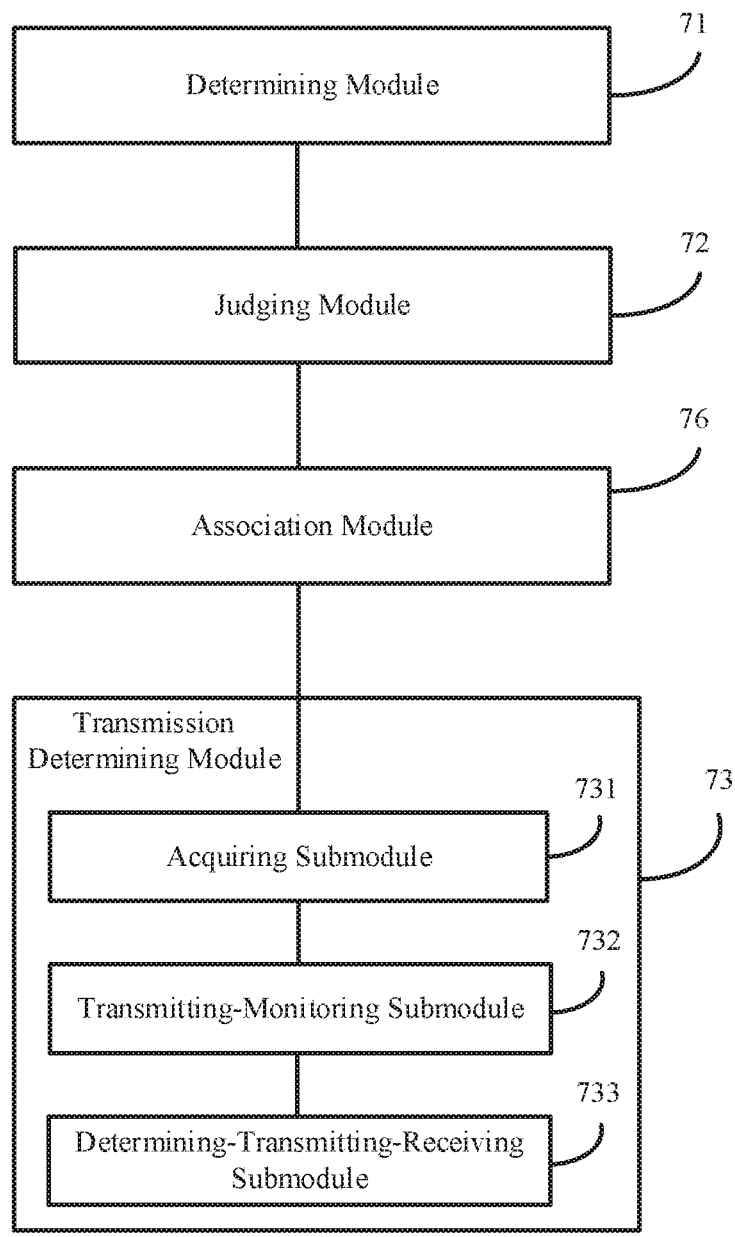
FIG. 8G is a block diagram of a random access device according to an exemplary embodiment.

FIG. 8G is a block diagram of a random access device according to an exemplary embodiment. As shown in FIG. 8G, on the basis of the embodiment shown in FIG. 8C, the device may further include: an association module 76 configured to associate with a downlink beam based on a downlink measurement signal before the acquiring submodule 731 acquires the PRACH resource of the multi-preamble transmission from a currently associated downlink beam.

In the above embodiment, with a downlink measurement signal, a downlink beam is associated, which provides a possibility for subsequently acquiring a PRACH resource of the multi-preamble transmission from a currently associated downlink beam.

Figure 9:
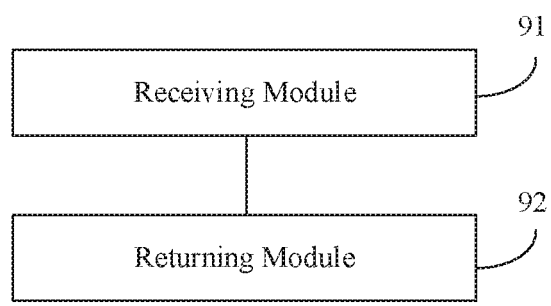
FIG. 9 is a block diagram of a random access device according to an exemplary embodiment.

FIG. 9 is a block diagram of a random access device according to an exemplary embodiment. As shown in FIG. 9, the random access device includes: a receiving module 91 and a returning module 92.

The receiving module 91 is configured to receive a preamble transmitted by UE through a multi-preamble transmission opportunity.

The multi-preamble transmission opportunity may include a starting time-frequency resource location, a repetition period, and a number of repetitions of the PRACH. For example, FIG. 2B is a schematic diagram showing the starting time-frequency resource location, the repetition period and the number of repetitions of the PRACH of one multi-preamble transmission opportunity.

In this embodiment, after the UE determines to use multi-preamble transmission, the UE may transmit the preamble through an acquired multi-preamble transmission opportunity, and the base station receives the preamble transmitted by the UE through the multi-preamble transmission opportunity.

The returning module 92 is configured to return a random access response RAR for the preamble and for the time-frequency resource location in the multi-preamble transmission opportunity according to the time-frequency resource location in the multi-preamble transmission opportunity in which the preamble received by the receiving module 91 is located, for the UE to perform random access.

In the above embodiment, the preamble transmitted by the UE through a multi-preamble transmission opportunity is received, and an RAR for the preamble and for the time-frequency resource location in the multi-preamble transmission opportunity is returned according to the time-frequency resource location in the multi-preamble transmission opportunity in which the received preamble is located, for the UE to perform random access. Thereby, it can achieve the objective of providing transmission resource for a qualified UE and saving transmission resources.

Figure 10:
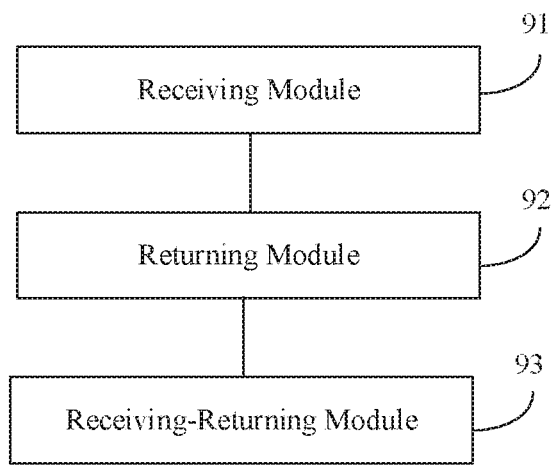
FIG. 10 is a block diagram of a random access device according to an exemplary embodiment.

FIG. 10 is a block diagram of a random access device according to an exemplary embodiment. As shown in FIG. 10, on the basis of the above embodiment shown in FIG. 9, the device may further include: a receiving-returning module 93.

The receiving-returning module 93 is configured to, after the returning module 92 returns an RAR for the preamble and for the time-frequency resource location in the multi-preamble transmission opportunity, receive a third message MSG3 transmitted by the UE and return a fourth message MSG4 to the UE according to the MSG3.

In the above embodiment, the third message MSG3 transmitted by the UE is received, and the fourth message MSG4 is returned to the UE according to the MSG3, thereby completing the random access procedure.

Figure 11A:
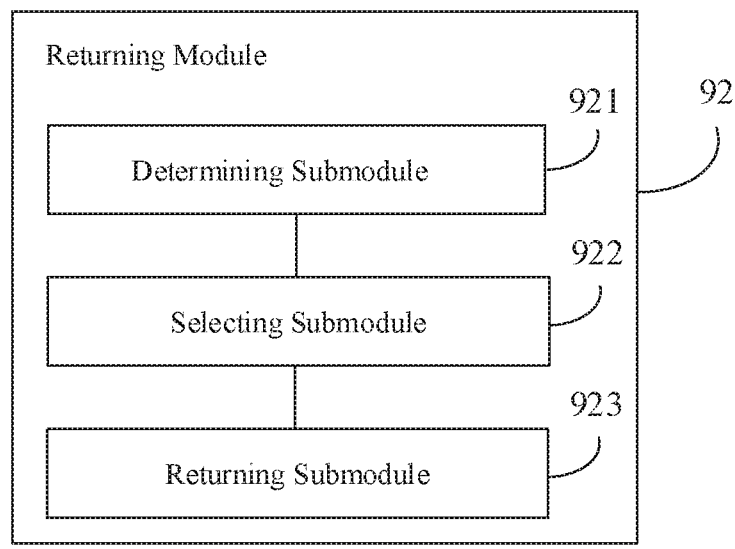
FIG. 11A is a block diagram of a random access device according to an exemplary embodiment.

FIG. 11A is a block diagram of a random access device according to an exemplary embodiment. As shown in FIG. 11A, on the basis of the above embodiment shown in FIG. 9, a multi-preamble transmission opportunity includes a starting time-frequency resource location, a repetition period, and a number of repetitions of a physical random access channel PRACH. The returning module 92 may include a determining submodule 921, a selecting submodule 922, and a returning submodule 923.

The determining submodule 921 is configured to determine the time-frequency resource location at which the received preamble is located and all repeated time-frequency resource locations in the current multi-preamble transmission opportunity.

It is assumed that after selecting a preamble from the preamble resource pool, the UE may start transmitting the selected preamble from the next multi-preamble transmission opportunity, that is, the first time-frequency resource location 421 of the multi-preamble transmission opportunity 42 shown in FIG. 2B. If the number of transmission beams supported by the UE is 3, that is, the number of transmission beams supported by the UE is less than the number of repetitions, the selected preamble is transmitted on two time-frequency resource locations after the first time-frequency resource location 421, that is, at a time-frequency resource location 422 and a time-frequency resource location 423. After receiving the preamble, the base station may determine that the time-frequency resource location at which the received preamble is located and all repeated time-frequency resource locations in the current multi-preamble transmission opportunity are respectively the first time-frequency resource location 421 and the time-frequency resource locations 422 and 423.

The selecting submodule 922 is configured to, among preambles having the same preamble identifier received from the time-frequency resource location and all the repeated time-frequency resource locations determined by the determining submodule 921, select the preamble with the best signal quality.

The UE selects the preamble with the best signal quality from the preamble with the same preamble identifier received by the first time-frequency resource location 421 and the time-frequency resource locations 422 and 423.

The returning submodule 923 is configured to return an RAR according to the time-frequency resource location where the preamble with the best signal quality is located, where the RAR carries the preamble identifier corresponding to the preamble with the best signal quality.

The time-frequency resource location where the preamble with the best signal quality is located may include at least one of an Orthogonal Frequency Division Multiplexing (OFDM) symbol location, a subframe location, and a frequency domain location where the preamble with the best signal quality is located. At least one of an Orthogonal Frequency Division Multiplexing (OFDM) symbol location, a subframe location, and a frequency domain location where the preamble with the best signal quality is located may be represented by an RA-RNTI.

After determining the preamble with the best signal quality, an RAR may be returned according to the time-frequency resource location where the preamble with the best signal quality is located, for the UE to determine a transmission beam that the RAR responds to.

In the above embodiment, by selecting a preamble with the best signal quality and returning an RAR according to the time-frequency resource location where the best preamble of the signal quality is located, it can save resource consumption.

Figure 11B:
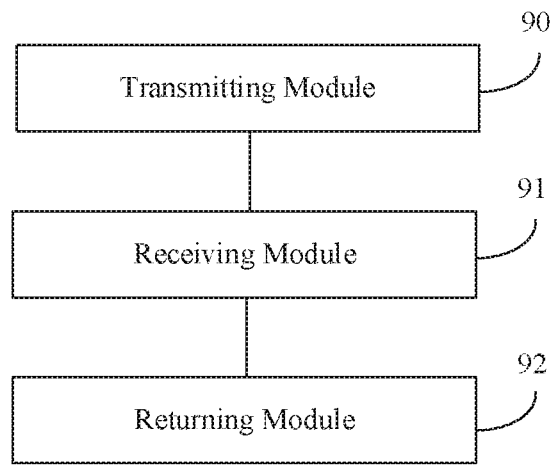
FIG. 11B is a block diagram of a random access device according to an exemplary embodiment.

FIG. 11B is a block diagram of a random access device according to an exemplary embodiment. As shown in FIG. 11B, on the basis of the above embodiment shown in FIG. 9, the device may further include a transmitting module 90.

The transmitting module 90 is configured to, before the receiving module 91 receives the preamble transmitted by UE through the multi-preamble transmission opportunity, transmit a broadcast message to the UE, where the broadcast message carries a PRACH resource for multi-preamble transmission of each beam.

In the above embodiment, by transmitting a broadcast message to the UE, so that the UE can transmit the preamble according to the PRACH resource carried in the broadcast message.

Figure 12:
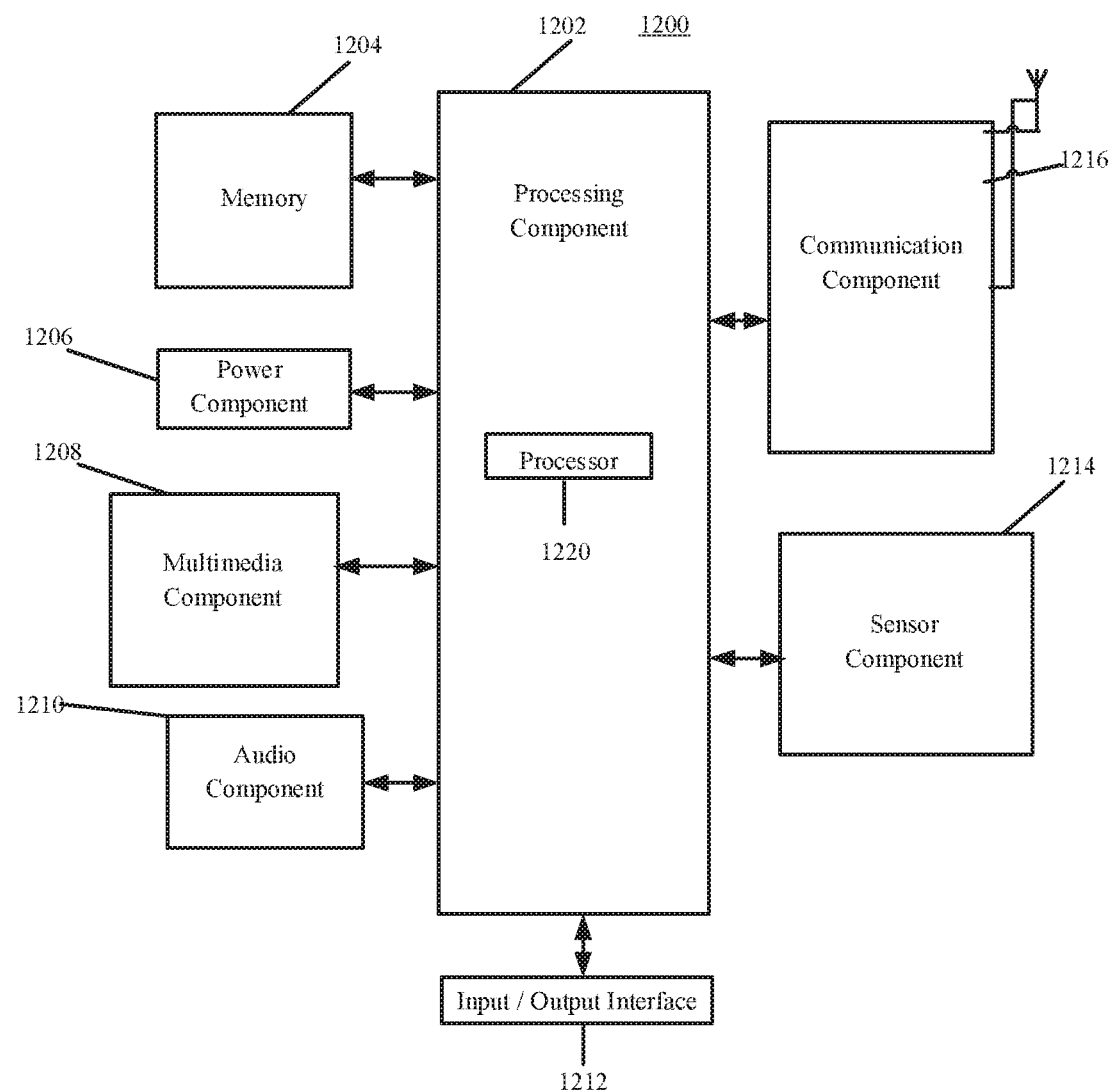
FIG. 12 is a block diagram of a random access device according to an exemplary embodiment.

FIG. 12 is a block diagram of a random access device 1200 according to an exemplary embodiment. For example, the device 1200 may be a mobile phone, a computer, a digital broadcast terminal, a messaging device, a game console, a tablet device, a medical device, a fitness device, a personal digital assistant, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, phone call, data communications, camera operations, and recording operations. The processing component 1202 may include one or more processors 1220 to execute instructions, to perform all or part of the steps of the above method. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200, contact data, telephone directory data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. When the device 1200 is in an operation mode, such as a shooting mode or a video mode, the front camera and/or the rear camera can receive external multimedia data. Each front and rear camera can be a fixed optical lens system or have focal length and optical zoom capability.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. These buttons may include, but are not limited to, a home button, a volume button, a start button, and a lock button.

The sensor component 1214 includes one or more sensors to provide status assessments of various aspects of the device 1200. For instance, the sensor component 1214 may detect an on/off status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 4G, or 5G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. In one exemplary embodiment, the communication component 1216 may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above described methods.

In exemplary embodiments, there is also provided a non-transitory computer-readable storage medium including instructions, such as included in the memory 1204, executable by the processor 1220 in the device 1200 to perform the above described methods. For example, the non-transitory computer-readable storage medium may be a ROM, a random access memory (RAM), a CD-ROM, a magnetic tape, a floppy disc, an optical data storage device, and the like.

Figure 13:
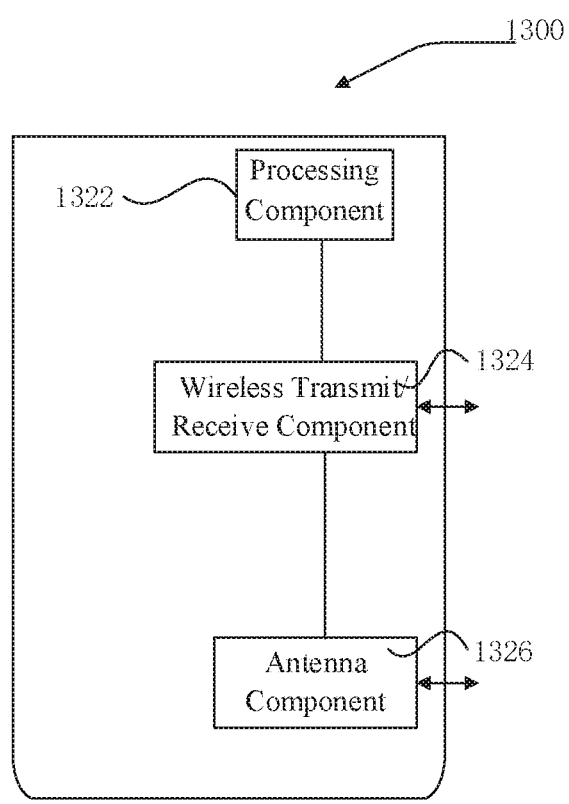
FIG. 13 is a block diagram of a random access device according to an exemplary embodiment.

FIG. 13 is a block diagram of a random access device 1300 according to an exemplary embodiment. The device 1300 can be provided as a base station. Referring to FIG. 13, the device 1300 includes a processing component 1322, a wireless transmit/receive component 1324, an antenna component 1326, and a signal processing portion specific to the wireless interface. The processing component 1322 can further include one or more processors.

One processor of the processing component 1322 can be configured to: receive a preamble transmitted by UE through a multi-preamble transmission opportunity; and return a random access response RAR for the preamble and for the time-frequency resource location in the multi-preamble transmission opportunity according to the time-frequency resource location in the multi-preamble transmission opportunity in which the received preamble is located, for the UE to perform random access.

In an exemplary embodiment, there is also provided a non-transitory computer readable storage medium including instructions executable by processing component 1322 of the device 1300 to perform the random access methods described above. For example, the non-transitory computer readable storage medium can be a ROM, a random access memory (RAM), a CD-ROM, a magnetic tape, a floppy disk, and an optical data storage device.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

The device embodiments basically correspond to the method embodiments, and reference may be made to the description of the method embodiments. The device embodiments described above are merely illustrative, wherein the modules/units described as separate components may or may not be physically separate, and the components displayed as modules/units may or may not be physical modules/units. That is, they may be located at one place, or may be distributed to multiple networks. Some or all of the modules may be selected according to actual needs.

It should be noted that, relational terms such as "first" and "second" herein are used merely to distinguish one entity or operation from another entity or operation, and do not necessarily require or imply that there is any such actual relationship or order among these entities or operations.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A random access method for user equipment (UE), comprising:
   determining to initiate random access;
   judging whether or not to use multi-preamble transmission; and
   when determining to use multi-preamble transmission, transmitting a preamble through an acquired multi-preamble transmission opportunity, to perform random access,
   wherein transmitting a preamble through an acquired multi-preamble transmission opportunity, to perform random access comprises:
   acquiring a physical random access channel (PRACH) resource of the multi-preamble transmission from a currently associated downlink beam, wherein the PRACH resource indicates a multi-preamble transmission opportunity, and the multi-preamble transmission opportunity comprises a starting time-frequency resource location, a repetition period, and a number of repetitions of the PRACH; and
   starting transmitting a preamble from a first time-frequency resource location of a next multi-preamble transmission opportunity, comprising:
   selecting a preamble from a preamble resource pool, and starting transmitting the selected preamble from the first time-frequency resource location of the next multi-preamble transmission opportunity;

if a number of transmission beams supported by the UE is less than the number of repetitions, transmitting the selected preamble at a first preset number of time-frequency resource locations after the first time-frequency resource location, or repeatedly transmitting a second preset number of transmission beams, wherein the first preset number is equal to the number of transmission beams minus one, and the second preset number is equal to a difference between the number of repetitions and the number of transmission beams; and if the number of transmission beams supported by the UE is greater than the number of repetitions, transmitting the selected preamble by selecting the same number of transmission beams as the number of repetitions.

2. The method according to claim 1, wherein judging whether or not to use multi-preamble transmission comprises at least one of:

judging whether a service that triggers the random access is a preset type of service, and if it is the preset type of service, determining to use multi-preamble transmission;

judging whether a multi-preamble transmission function is enabled, and if the multi-preamble transmission function is enabled, determining to use multi-preamble transmission;

judging whether the UE determines to transmit an uplink beam of the preamble, and if the UE does not determine to transmit an uplink beam of the preamble, determining to use multi-preamble transmission;

judging whether the UE is a preset type of UE, and if the UE is the preset type of UE, determining to use multi-preamble transmission;

judging whether the random access is a preset access type, and if the random access is the preset access type, determining to use multi-preamble transmission;

judging whether the UE has a multiple input multiple output (MIMO) capability or a multi-beam transmission capability, and if the UE has the MIMO capability or the multi-beam transmission capability, determining to use multi-preamble transmission; and judging whether the UE has a transmission-reception (Tx-Rx) correspondence capability, and if the UE does not have the Tx-Rx correspondence capability, determining to use multi-preamble transmission.

3. The method according to claim 2, wherein judging whether a multi-preamble transmission function is enabled comprises:

if a physical random access channel (PRACH) resource of the multi-preamble transmission is configured in a received system message, determining that the multi-preamble transmission function of the UE is enabled;

if the UE is in a disabled state or a connected state and a base station configuration turns on the multi-preamble transmission function of the UE, determining that the multi-preamble transmission function of the UE is enabled; and if the base station configuration turns on a data bearer (DRB) of the UE or a multi-preamble transmission function of a logical channel, and the random access is triggered by the DRB or the logical channel that has the multi-preamble transmission function turned on, and the random access is competitive random access, determining that the multi-preamble transmission function of the UE is enabled.

4. The method according to claim 2, wherein judging whether the UE is a preset type of UE comprises:

if a UE type indicated in a received physical random access channel (PRACH) resource of the multi-preamble transmission from a base station is the preset type, determining that the UE is the preset type of UE; and judging whether the random access is a preset access type comprises:

if an access type indicated in the received PRACH resource of multi-preamble transmission from the base station is the preset access type, determining that the random access is the preset access type.

5. The method according to claim 1, wherein transmitting a preamble through an acquired multi-preamble transmission opportunity, to perform random access further comprises:

starting monitoring a random access response (RAR) reception window at the end of all preamble transmissions; and if an RAR is received in the RAR reception window, determining a transmission beam that the RAR responds to, transmitting a message MSG3 to the base station through the transmitting beam, and waiting for a message MSG4 returned by the receiving base station.

6. The method according to claim 5, further comprising:

if the RAR is not received in the RAR reception window or the message MSG4 returned by the base station is not received, and the UE does not reach a maximum transmission power, raising a transmission power of the UE, and proceeding to perform starting transmitting a preamble from the first time-frequency resource location of the next multi-preamble transmission opportunity.

7. User equipment (UE), comprising:

a processor; and a memory storing instructions executable by the processor, wherein the processor is configured to:

determine to initiate random access;

judge whether or not to use multi-preamble transmission; and when determining to use multi-preamble transmission, transmit a preamble through an acquired multi-preamble transmission opportunity, to perform random access, wherein in transmitting the preamble through the acquired multi-preamble transmission opportunity, to perform random access, the processor is further configured to:

acquire a physical random access channel (PRACH) resource of the multi-preamble transmission from a currently associated downlink beam, wherein the PRACH resource indicates a multi-preamble transmission opportunity, and the multi-preamble transmission opportunity comprises a starting time-frequency resource location, a repetition period, and a number of repetitions of the PRACH; and start transmitting a preamble from a first time-frequency resource location of a next multi-preamble transmission opportunity, comprising:

selecting a preamble from a preamble resource pool, and starting transmitting the selected preamble from the first time-frequency resource location of the next multi-preamble transmission opportunity;

if a number of transmission beams supported by the UE is less than the number of repetitions, transmitting the selected preamble at a first preset number of time-frequency resource locations after the first time-frequency resource location, or repeatedly transmitting a second preset number of transmission beams, wherein the first preset number is equal to the number of transmission beams minus one, and the second preset number is equal to a difference between the number of repetitions and the number of transmission beams; and if the number of transmission beams supported by the UE is greater than the number of repetitions, transmitting the selected preamble by selecting the same number of transmission beams as the number of repetitions.

8. The UE according to claim 7, wherein in judging whether or not to use multi-preamble transmission, the processor is further configured to perform at least one of:

judging whether a service that triggers the random access is a preset type of service, and if it is the preset type of service, determining to use multi-preamble transmission;

judging whether a multi-preamble transmission function is enabled, and if the multi-preamble transmission function is enabled, determining to use multi-preamble transmission;

judging whether the UE determines to transmit an uplink beam of the preamble, and if the UE does not determine to transmit an uplink beam of the preamble, determining to use multi-preamble transmission;

judging whether the UE is a preset type of UE, and if the UE is the preset type of UE, determining to use multi-preamble transmission;

judging whether the random access is a preset access type, and if the random access is the preset access type, determining to use multi-preamble transmission;

judging whether the UE has a multiple input multiple output (MIMO) capability or a multi-beam transmission capability, and if the UE has the MIMO capability or the multi-beam transmission capability, determining to use multi-preamble transmission; and judging whether the UE has a transmission-reception (Tx-Rx) correspondence capability, and if the UE does not have the Tx-Rx correspondence capability, determining to use multi-preamble transmission.

9. The UE according to claim 8, wherein in judging whether a multi-preamble transmission function is enabled, the processor is further configured to:

if a physical random access channel (PRACH) resource of the multi-preamble transmission is configured in a received system message, determine that the multi-preamble transmission function of the UE is enabled;

if the UE is in a disabled state or a connected state and a base station configuration turns on the multi-preamble transmission function of the UE, determine that the multi-preamble transmission function of the UE is enabled; and if the base station configuration turns on a data bearer (DRB) of the UE or a multi-preamble transmission function of a logical channel, and the random access is triggered by the DRB or the logical channel that has the multi-preamble transmission function turned on, and the random access is competitive random access, determine that the multi-preamble transmission function of the UE is enabled.

10. The UE according to claim 8, wherein in judging whether the UE is a preset type of UE, the processor is further configured to:

if a UE type indicated in a received physical random access channel (PRACH) resource of the multi-preamble transmission from a base station is the preset type, determining that the UE is the preset type of UE; and if an access type indicated in the received PRACH resource of multi-preamble transmission from the base station is the preset access type, determine that the random access is the preset access type.

11. The UE according to claim 7, wherein in transmitting the preamble through the acquired multi-preamble transmission opportunity, to perform random access, the processor is further configured to:

start monitoring a random access response (RAR) reception window at the end of all preamble transmissions; and if an RAR is received in the RAR reception window, determine a transmission beam that the RAR responds to, transmit a message MSG3 to the base station through the transmitting beam, and wait for a message MSG4 returned by the receiving base station.

12. The UE according to claim 11, the processor is further configured to:

if the RAR is not received in the RAR reception window or the message MSG4 returned by the base station is not received, and the UE does not reach a maximum transmission power, raise a transmission power of the UE, and proceed to perform starting transmitting a preamble from the first time-frequency resource location of the next multi-preamble transmission opportunity.

13. A base station, comprising:

a processor; and a memory storing instructions executable by the processor, wherein the processor is configured to:

receive a preamble transmitted by user equipment (UE) through a multi-preamble transmission opportunity; and return, according to a time-frequency resource location in the multi-preamble transmission opportunity in which the preamble is located, a random access response (RAR) for the preamble and for the time-frequency resource location in the multi-preamble transmission opportunity, for the UE to perform random access, wherein the UE transmits the preamble through the multi-preamble transmission opportunity to perform random access, comprising:

acquiring a physical random access channel (PRACH) resource of multi-preamble transmission from a currently associated downlink beam, wherein the PRACH resource indicates the multi-preamble transmission opportunity, and the multi-preamble transmission opportunity comprises a starting time-frequency resource location, a repetition period, and a number of repetitions of the PRACH; and starting transmitting a preamble from a first time-frequency resource location of a next multi-preamble transmission opportunity, comprising:

selecting a preamble from a preamble resource pool, and starting transmitting the selected preamble from the first time-frequency resource location of the next multi-preamble transmission opportunity;

if a number of transmission beams supported by the UE is less than the number of repetitions, transmitting the selected preamble at a first preset number of time-frequency resource locations after the first time-frequency resource location, or repeatedly transmitting a second preset number of transmission beams, wherein the first preset number is equal to the number of transmission beams minus one, and the second preset number is equal to a difference between the number of repetitions and the number of transmission beams; and if the number of transmission beams supported by the UE is greater than the number of repetitions, transmitting the selected preamble by selecting the same number of transmission beams as the number of repetitions.

14. The base station according to claim 13, wherein the processor is further configured to:

after the RAR for the preamble and for the time-frequency resource location in the multi-preamble transmission opportunity is returned, receive a message MSG3 transmitted by the UE and return a message MSG4 to the UE according to the message MSG3.

15. The base station according to claim 13, wherein the processor is further configured to:

determine the time-frequency resource location at which the received preamble is located and all repeated time-frequency resource locations in the multi-preamble transmission opportunity;

among preambles having a same preamble identifier received from the time-frequency resource location and all the repeated time-frequency resource locations, select a preamble with best signal quality; and return the RAR according to the time-frequency resource location where the preamble with the best signal quality is located, wherein the RAR carries the preamble identifier corresponding to the preamble with the best signal quality.

16. The base station according to claim 15, wherein the time-frequency resource location where the preamble with the best signal quality is located comprises at least one of an Orthogonal Frequency Division Multiplexing (OFDM) symbol location, a subframe location, and a frequency domain location where the preamble with the best signal quality is located, and the at least one of an OFDM symbol location, a subframe location, and a frequency domain location where the preamble with the best signal quality is located is represented by a random access radio network temporary identifier (RA-RNTI).

17. The base station according to claim 13, wherein the processor is further configured to:

before receiving the preamble transmitted by the UE through the multi-preamble transmission opportunity, transmit a broadcast message to the UE, wherein the broadcast message carries a physical random access channel (PRACH) resource for multi-preamble transmission of each beam.

* * * * *